Figure 1:
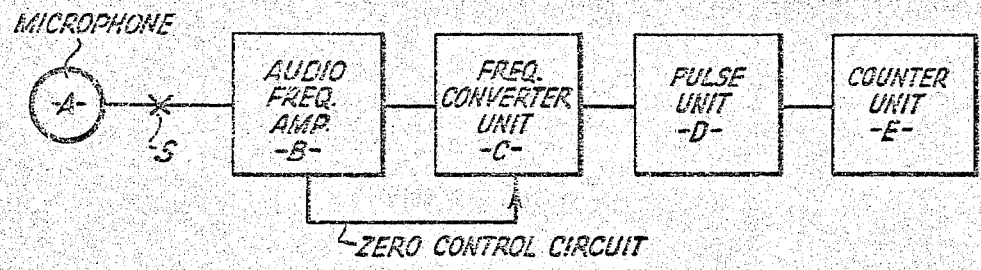

March 25, 1952     C. A. RACKEY ET AL     2,590,460
SOUND LEVEL AND SOUND INTEGRATING DEVICE
Filed March 19, 1948     2 SHEETS—SHEET 1

INVENTORS
CHESTER A. RACKEY
THOMAS H. PHELAN
BY
ATTORNEY

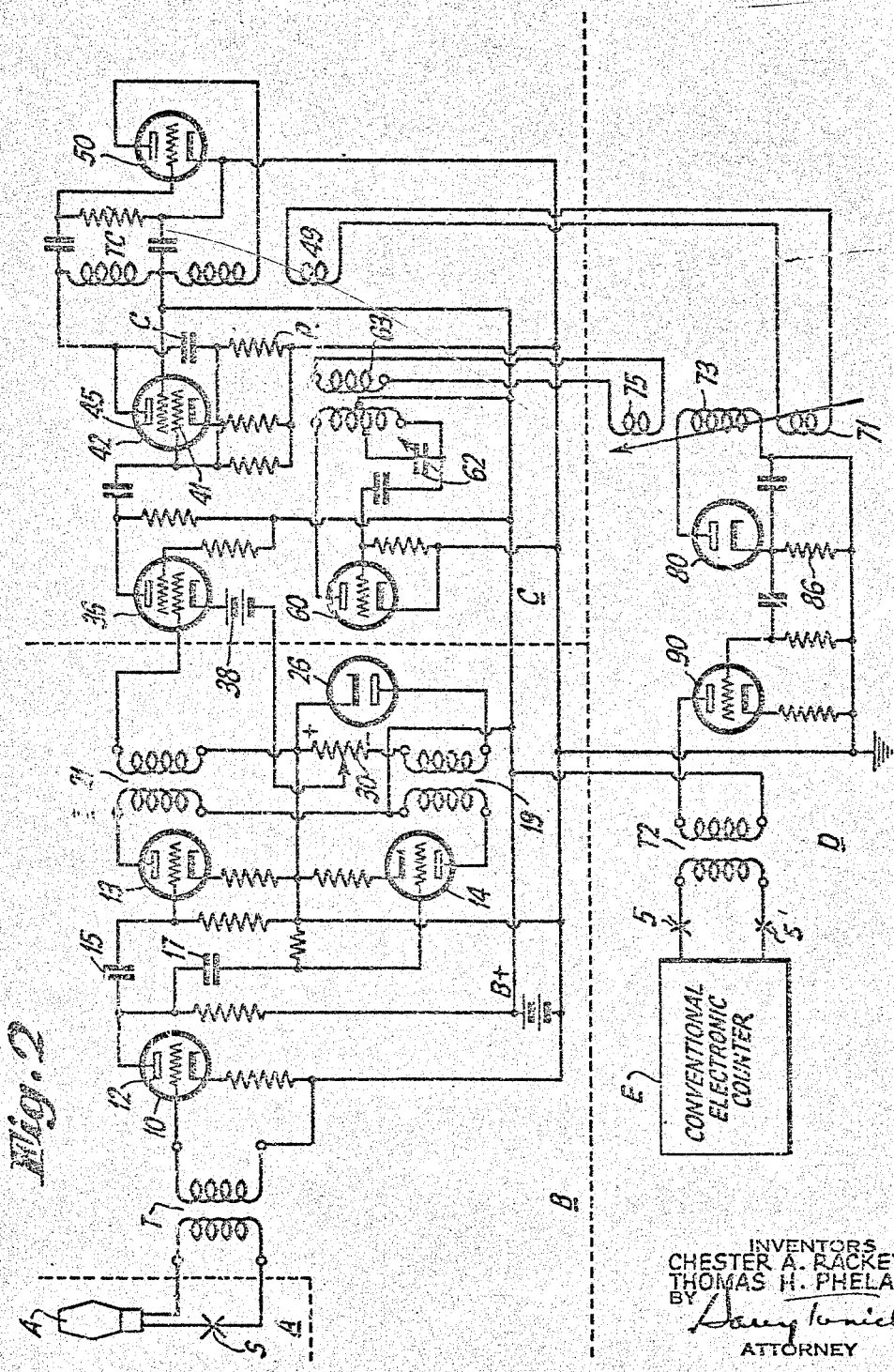

Patented Mar. 25, 1952

2,590,460

UNITED STATES PATENT OFFICE 2,590,460

SOUND LEVEL AND SOUND INTEGRATING DEVICE

Chester A. Rackey, Crestwood, N. Y., and Thomas H. Phelan, Maywood, N. J., assignors to Radio Corporation of America, a corporation of Delaware Application March 19, 1948, Serial No. 15,876

6 Claims. (Cl. 181—.5)

In this application, we disclose a new and improved means for measuring sound or other energy level and producing indications of the level thereof. For purposes of illustration, we have disclosed an embodiment to be used to measure the reaction of an audience at, for example, a radio broadcast studio. Our invention obviously may be put to other uses.

The general purpose of our invention is to provide an instantaneous reading power totalizer and to provide a sound power totalizing means to record applause from a broadcast studio audience which applause record is proportional to the total sound level in the studio and its time duration.

Sound level measuring and indicating apparatus is known in the art. Thus far in the art, it has been general practice to measure audience reaction by utilizing a microphone, an audio frequency amplifier and a more or less standard volume or level indicator. The indication of such a meter is roughly proportional to the instantaneous sound level received by the microphone. However, the scale of the meter is limited and tends to crowd varying reactions. Further, and most important, such a meter essentially reads "Peaks" or "Average" and does not take into account the duration of the sound level (applause) which is obviously an important element. In other words, such indications lack the time element involved where the sound being measured is sustained. The time element is important where the reaction of an audience to a radio program or the like is being measured. In our U. S. application Serial #732,832, filed January 18, 1947, now Patent #2,480,607, dated August 30, 1949, we have disclosed apparatus for sound level measurement which responds to sound peaks and time duration thereof. However, in said apparatus, the time component measurement is limited by virtue of the fact that a storage condenser is used to integrate voltage peaks representing sound. A meter is arranged to indicate the change in charge of the condenser. If voltages representing the sound are applied to the capacitor and are sustained, the capacitor will charge up, integrating said voltages, until the capacitor becomes fully charged. The integration then stops unless the sound level again rises. In practice, the sound level may decrease but still be sustained in which case integration cannot take place, and the reading on the meter is not a correct indication of the sound level as prolonged.

In our present application, we provide a sound level indicator which accurately integrates sound level and the time duration thereof irrespective of duration and of variations in the level during the time the measurement is being made. Our invention provides considerable improvement since it takes into consideration both the time duration of the sound level and its magnitude and also provides for all practical purposes an unlimited scale for recording the total results.

Figure 3:
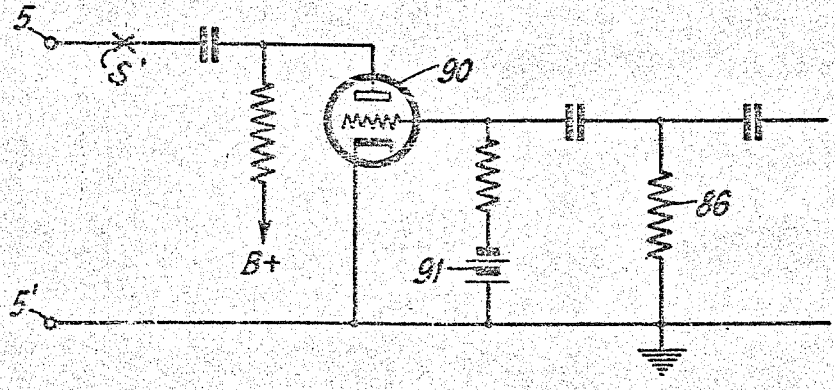

In describing our invention, reference will be made to the attached drawings, where Fig. 1 illustrates by block diagram and line connection, a sound level integrator arranged in accordance with our invention, Fig. 2 shows by circuit element and circuit element connections the essential features of a sound level indicator arranged in accordance with our invention, while Fig. 3 illustrates a modification of a portion of the circuit of Fig. 2.

The rectangles in Fig. 1 have been labeled A, B, C, D and E and corresponding labels are used in Fig. 2.

In its broadest aspect, our invention consists essentially, as shown schematically in Fig. 1, of a microphone A connected by switch S to an audio frequency amplifier B and a means C of converting the audio amplitude variations into frequency variations with a means D for changing the frequency variations into pulses and a unit E for recording and counting or otherwise displaying the total number of pulses produced by the system.

In operation, a microphone A picks up the sound (applause) produced by the audience and (when switch S is closed) converts the same into electrical currents directly proportional to the sound level. The electrical energy is suitably increased in magnitude by means of the audio frequency amplifier B and is transferred to the frequency converter unit C. This unit consists of a modulator oscillator unit and an amplifier. The electrical energy, which is varying in amplitude at a comparatively slow rate, is used in C to change the frequency of the oscillator in proportion to the amplitude variations of the incoming electrical energy. The oscillator output is then increased in magnitude and delivered to the pulse unit D. To provide zero output from this unit C when the sound level fed to A and set up in B has dropped to a predetermined threshold level, a suitable bias control circuit is fed from unit B to an amplifier in C to control the operating characteristics of unit C. This method of providing zero output from unit C during times of no input from the amplifier B further operates as follows: Unit C contains two oscillators with their outputs arranged to be in effective when the signal level is below a critical value. The output frequency of one is varied as mentioned above and thus the beat frequency is passed along to pulse unit D.

The pulse unit D is an arrangement of vacuum tube circuits such that at its output pulses of current and voltage are furnished which bear a direct relationship to the variations in frequency received from unit C. Since the frequency of the output of unit C includes a time element, the number of pulses furnished at the output of the pulse unit D is proportional to the frequency input to the unit and the time duration of this frequency.

The output of the pulse unit D is then fed into a counter E. This consists either of a direct electro-mechanical counter, or some sort of electronic counter. The particular unit chosen will depend on the frequency of the pulses out of unit D and the visual method in which it is intended to display the results. A simpler method is to rectify the pulses, charge a condenser and measure the charge with a D.-C. meter, but this method does not provide an unlimited or uncrowned scale.

Details of the system are shown in Fig. 2. A again is the microphone and the microphone is coupled (when switch S is closed) by a transformer T to the control grid of an audio amplifier in unit B. This amplifier has several stages of resistance coupled tubes with transformer coupled input and output. The anode 12 of the amplifier tube 10 supplies output to the control grids of triodes 13 and 14 by way of capacitors 15 and 17 respectively. The tubes 13 and 14 are conventional amplifiers and have their anodes connected in the primary circuits of transformers 21 and 19 respectively. The transformer 19 has a secondary winding coupled with a diode 26 in such a manner as to produce across resistor 30, when alternating current flows in transformer 19, a potential drop which is positive at the cathode end of potentiometer 30 and negative at the anode end thereof. This potential is used as described hereinafter to control the gain of the amplifier stage tube 36 in the frequency converter stage C. The D.-C. voltage produced in resistor 30 is proportional to the average audio frequency signal level and to the sound level and this is the voltage used for threshold or zero control of the frequency convertor in unit C.

The secondary winding of transformer 21 is coupled to the control grid of tube 36 which is also an amplifier. Preferably, an amplifier of the super-control type such as a 6SK7 is used at 36. These tubes have a sharp cut-off characteristic. The amplifier 36 has its anode coupled to the control grid of a reactance tube 42 for reasons described hereinafter. The potential drop at the end of 30 adjacent the cathode of diode 26 is positive, and goes to the grid of tube 36. The source 38 has its positive terminal connected to the cathode of tube 36 and its negative terminal connected to a movable point on potentiometer 30 so that these voltages are opposed. The potentials at 30 and at 38 are made such by adjustment of potentiometer 30 and selection of source 38 that when no sound is applied to the microphone, the tube 36 is cut off. When the sound is applied to the microphone and reaches a predetermined threshold value (above hall noise or random noise) rectification takes place in tube 26 and the negative (cathode) potential developed at potentiometer 30 grows and brings the potential on the grid of tube 36 toward the cathode potential and tube 36 is turned on. The tube 36 of the unit C thus acts as a voltage limiter and as connected is actuated by the D.-C. potential developed at potentiometer 30 of the zero control circuit excited from unit B. This control is so adjusted that when the audio level in the amplifier B rises above a predetermined level, the limiter tube 36 permits audio signals from the amplifier B to be passed to the grid 41 of the reactance tube 42. The reactance tube varies the frequency of the oscillator 50 as described hereinafter.

The reactance tube 42 is in the tank circuit TC of an oscillation generator 50 of the regenerative type. The operation of the generator is apparent and it will not be described here. However, a point on the tank circuit of the tube 50 is coupled to the anode 45 of tube 42 to include the tube impedance of tube 42 across the tank circuit TC. The tank circuit TC is also coupled by capacitor C and resistor R to the control grid 41 to apply thereto a voltage displaced in phase about 90° with respect to the voltage on the anode 45 of tube 42. The reactance tube is conventional and will not be described in detail here. It may be capacitive or inductive. However, it is noted that the reactance provided by tube 42 as shown is capacitive and is in the oscillator 50 tank circuit and varies with variations in the sound level because the latter controls the conductivity of tube 42. The oscillator 50 runs all of the time and its frequency is controlled by the reactance tube 42 which in turn is controlled by the sound level. At zero sound level, i. e., before said predetermined level at which tube 36 passes voltages to the grid 41, the frequency of the oscillator 50 may be assumed to be F. When sound above this level is applied the parallel capacitive reactance of tube 42 in the tank circuit increases and reduces the frequency F directly proportionally with respect to the sound level.

The oscillator 60 is conventional and is tuned by capacitor 62 to the frequency F at which the oscillator 50 operates at zero sound level. Inductor 49 is coupled to the oscillator 50 and is in a circuit including a second inductance 71 coupled to an inductance 73 in a detector circuit including tube 80. Oscillations from the oscillator 60 are fed from the tank circuit to an inductor 63 in a circuit with an inductor 75 also coupled to inductance 73. Thus, oscillators 50 and 60 both supply oscillatory energy to the rectifier 80. When the frequencies of the energies developed at 50 and 60 are different, beat notes are produced in the resistor 86 in the cathode return circuit of rectifier 80. In the embodiment described the frequencies generated are the same at zero signal, so that when one frequency is changed the beat notes are of audible frequencies. An A.-C. potential is accordingly developed across 86 which is equal in frequency to the difference between the frequency of the oscillations generated in 50 and 60. The A.-C. potential at 86 varies in frequency directly proportional to the sound level of microphone A. This A.-C. of varying frequency is amplified in amplifier 90 which may be conventional and fed by transformer T2 to a cycle counter E. A conventional cycle counter including a reset switch may be used here. Preferably, a counter of the type disclosed in Morton et al. 2,409,689 is used here. The counter of this patent is driven by negative pulses and then means is provided between the secondary of transformer T2 and th counter input to convert the low frequency A.-C. to uni-directional pulses. For example, a tube biased to cut off and excited at its grid by the output of tube 90 has a plate potential which varies in a negative direction to drive the counter. However, if desired, the couplings from resistor 86 to the counter may be modified as illustrated in Fig. 3. In this embodiment, a source 91 of D.-C. is connected in the grid bias circuit of tube 90 to bias the same beyond cut-off. Then the anode of tube 90 swings in a negative direction on positive halves of the low frequency A.-C. cycle. Then the points 5 and 5' correspond to the points 5 and 5' of Morton et al. 2,409,689.

The operation of this device is as follows:

1. The time period over which the sound, or other energy, is to be integrated is determined by the closing and opening of switch S.

2. The energy threshold above which the device will register is determined by the setting of potentiometer 30.

Thus, the device may be used, for example, for measuring applause over a definite period, in which case, the threshold would be adjusted so that normal room noises would not register. Such a threshold setting would be relatively low. In another case, however, when a determination of sound level above, for example, a tolerable maximum as in a noisy factory, or with respect to street traffic is desired, the threshold setting would be relatively high.

By beating the oscillatory energies developed at 50 and 60 down to a low value, sensitivity and linearity are improved and the operation range expanded because frequency changes at low frequency are of greater percentage than the corresponding frequency changes at the high frequency F.

Thus, we have an unlimited scale counter which produces indications depending on the time duration and in proportion to the sound level of microphone A. This gives a true integrated registration of the sound level over a period of time.

The counter in unit E may be conventional, as stated above, and may comprise a plurality of decade counters or it may comprise a simple condenser and resistor in a tube rectifier circuit with a D.-C. meter across the condenser to measure the charge run. However, when an unlimited uncrowded scale reading is desired, a more elaborate counter of the decade type is used at E.

What is claimed is:

1. In a sound level and duration meter, an amplifier excited by alternating current potential representing said sound, apparatus controlled by the output of said amplifier for producing oscillatory energy of fixed frequency when said sound level is below a selected level and of a varying frequency directly proportional to the alternating current potential magnitude when said sound level is above said selected level, apparatus for generating pulses the rate of recurrence of which is directly proportional to the value of the varying frequency and means for counting said pulses.

2. In apparatus for measuring sound level, a first oscillator operating at a frequency F, a second oscillator operating at said frequency F when said sound level is at a critical value, means for changing the frequency of operation of said second oscillator proportionally with changes in said sound level above said critical value, combining apparatus coupled with both of said oscillators for producing a beat note resulting from change in the frequency of said second oscillator, and a beat note counter coupled to said combining apparatus.

3. In sound level measuring apparatus, a pick up device, an amplifier device coupled thereto, an electron control device amplifier having input electrodes including a control electrode coupled to the output of said amplifier device and having output electrodes, a rectifier coupled to said amplifier device and including as a load circuit a resistor in a biasing circuit for said control electrode, an oscillation generator, a reactance tube modulator coupled to said output electrodes, to be controlled by the output of said control device amplifier, and coupled to said generator to modulate the frequency of the same, and apparatus for measuring the frequency of the oscillations generated.

4. In apparatus for sound level measurement a first oscillator of variable frequency, a frequency modulator therefor, apparatus for picking up said sound and converting the same to currents the magnitude of which varies in a manner corresponding to variations in the sound level, a coupling between said apparatus and said modulator, rectifying means responsive to said currents for producing a control potential and applying the same to said coupling to permit said modulator to respond only to currents above a selected magnitude, and means for measuring the frequency of the oscillations generated.

5. In sound level measuring apparatus, a sound responsive device operative for a selected time interval, an amplifier tube coupled thereto, an electron discharge device amplifier having input electrodes including a control grid coupled to the output of said amplifier tube and having output electrodes, a rectifier coupled to said amplifier tube and including as a load circuit a resistor in a biasing circuit for said control grid, an oscillation generator, a reactance tube modulator coupled to said output electrodes, to be controlled by the output of said discharge device amplifier, and coupled to said generator to modulate the frequency of the same, a second oscillation generator, a combining circuit coupled to said generators to derive the beat note developed by combining oscillations from said generators, and apparatus for counting the cycles of said beat note occurring during said time interval.

6. In combination, means for producing a potential having a frequency which changes substantially in direct proportion to the successive values of a variable quantity, means for producing a pulse for each cycle of said potential, means for counting and indicating said pulses, and means responsive to said quantity for preventing production of said pulses until said quantity exceeds a predetermined value.

CHESTER A. RACKEY.
THOMAS H. PHELAN.

REFERENCES CITED

The following references are of record in the file of this patent:

UNITED STATES PATENTS

| Number | Name | Date |
|---|---|---|
| 2,050,674 | Stover | Aug. 11, 193_ |
| 2,353,203 | Usselman | July 11, 194_ |
| 2,337,496 | Cornelius | Oct. 23, 194_ |
| 2,469,282 | Stanmyre | May 3, 194_ |
| 2,434,218 | Giffen | Oct. 11, 194_ |